United States Patent [19]

Lee et al.

[11] Patent Number: 4,490,319

[45] Date of Patent: Dec. 25, 1984

[54] RAPID RATE SINTERING OF CERAMICS

[75] Inventors: Minyoung Lee; Marcus P. Borom, both of Schenectady; Lawrence E. Szala, Scotia, all of N.Y.

[73] Assignee: General Electric Company, Schenectady, N.Y.

[21] Appl. No.: 545,706

[22] Filed: Oct. 26, 1983

[51] Int. Cl.³ .............................................. C04B 35/58
[52] U.S. Cl. ...................................... 264/65; 264/66; 264/325; 501/87; 501/93; 501/96; 501/105; 501/127
[58] Field of Search .......................... 264/66, 325, 65; 501/87, 127, 105, 93, 96

[56] References Cited

U.S. PATENT DOCUMENTS

| | | | |
|---|---|---|---|
| 3,594,456 | 7/1971 | Berenshtein | 264/66 |
| 4,022,584 | 5/1977 | Budy | 228/122 |
| 4,108,652 | 8/1978 | Ogawa | 264/325 |
| 4,255,373 | 3/1981 | Kalinin | 264/66 |
| 4,383,957 | 5/1983 | Yamakawa | 264/65 |

OTHER PUBLICATIONS

"Material Transport During Sintering of Materials with the Fluorite Structure" by Morgan and Yust, [Journal of Nuclear Materials, 10, 3 (1963), 182–190].
"Plasma Sintering of Alumina" by Kim, et al., [Ceramic Bulletin, vol. 62, No. 5, (1983), 620–622].
"Microwave Sintering of Ferrites" by Krage, [Ceramic Bulletin, vol. 60, No. 11, (1981), 1232–1234].
"Glow Discharge Sintering of Alumina" by Bennett, et al., [Materials Science Research, vol. 4, (1969), edited by Gray, et al., pp. 408–412].
"Examination of the Densification Process and the Structure Formation In Short-Time Sintering of Cemented Carbides" by Hermel, et al., [5th International Round Table Conference on Sintering, Material Science Monographs, vol. 14, pp. 579–584, Kolar, et al., (Eds.), 1982, Elsevier Publishing Co., Amsterdam].
"Ultra-Rapid Sintering of Ceramics" by Johnson and Kim, [5th International Round Table Conference on Sintering, Material Science Monographs, vol. 14, pp. 573–578, Kolar, et al., (Eds.), 1982, Elsevier Publishing Co., Amsterdam].
"Short-Time Induction Sintering of Hardmetals" by Hermel, et al., [Presented at 1981 Meeting of the United Kingdom Powder Metallurgy Group, Scarborough, Oct. 26–28].

Primary Examiner—John A. Parrish
Attorney, Agent, or Firm—Leo I. MaLossi; James C. Davis, Jr.; James Magee, Jr.

[57] ABSTRACT

High-strength, fine-grain multi-phase substantially crystalline sintered ceramic bodies are produced by a process comprising the steps of cold pressing, followed by sintering at a high temperature, the temperature increase to maximum sintering temperature being accomplished by the use of a heating rate in excess of about 100° C./minute.

50 Claims, 6 Drawing Figures

RAPID RATE SINTERING OF CERAMICS

This invention relates to the provision of reliable, reproducible manufacturing methods for producing high-strength, fine-grain sintered ceramic bodies. Although the prime interest is in the preparation of alumina-base sintered bodies, the process of this invention appears to be broadly applicable to the sintering of ceramic powders.

BACKGROUND OF THE INVENTION

Ceramic cutting tools have been in use for a long time, but the relatively low strength of ceramic materials compared with other common tool materials, such as cemented carbides, and the resulting generally poor performance characteristics of ceramics has limited the application of tools prepared from these materials.

The predominant manufacturing process for the preparation of dense polycrystalline ceramic bodies is hot pressing. In this process, ceramic particles are placed in a graphite mold and sintered under conditions of temperature ranging from 1500° to 1800° C. with a simultaneous pressure application ranging from about 100 to 400 kg./sq.cm. Increases in rupture strength have been obtained through refinement of the grain size of the sintered product. This has required increasingly stringent process conditions encompassing the use of very fine starting powder, utilizing as low a process temperature as would be effective in bringing about the sintering, and the addition of sintering additives. One pronounced advance in alumina-base ceramic cutting tool technology has been the use of alumina-titanium carbide ($Al_2O_3$-TiC) composite material.

Some of the early sintered ceramic cutting tools contained small amounts of carbides, including TiC as sintering additives (*Ceramics in Machining Processes.*, by A. G. King and W. M. Wheildon, Academic Press, New York, 1966), but the first commercial dense polycrystalline ceramic cutting tool containing major amounts of TiC in addition to $Al_2O_3$ is a relatively recent development. The production thereof is described in U.S. Pat. No. 3,580,708—Ogawa et al., and employs hot pressing. Experimental production of a similar composition material for hot pressing at higher temperatures (i.e., 1800°–1850° C.) was reported earlier ("Preparation of Alumina-Titanium Carbide Bodies by Hot Pressing Techniques", H. N. Barr, G. D. Cremer and W. J. Koshuba; Powder Met. Bull, Vol. 5, No. 4, September 1950).

Cutting tools containing a significant amount of metal in addition to $Al_2O_3$-TiC are described in U.S. Pat. No. 3,542,529—Bergna et al. The addition of titanium oxide to the $Al_2O_3$-TiC system is described in U.S. Pat. No. 4,063,908—Ogawa et al, such addition making it possible to reduce the hot pressing temperature. All of the above rely upon hot pressing to accomplish densification. Another hot pressing patent is U.S. Pat. No. 4,204,873—Yamamoto et al., in which a different alumina-base system is employed; namely, alumina-tungsten carbide with an addition of titanium nitride.

The sintering of cold pressed powder compacts of aluminum oxide and refractory transition metal diborides is described in U.S. Pat. No. 4,022,584—Rudy. It is also disclosed therein that grain growth stability of the alloy phases is significantly improved by the addition of carbides and nitrides, such additions necessitating higher sintering temperatures or pressure-sintering (i.e., hot pressing). U.S. Pat. No. 4,383,957—Yamakawa et al., describes the sintering of a ceramic composition in an atmosphere of, or containing, carbon monoxide gas. The Yamakawa et al. patent describes hot pressing as having the disadvantage of being "very high priced and unsuitable for the production . . . of an article with a complicated shape" (col. 1, lines 59–62). In the Yamakawa et al. patent, certain sintered bodies were further subjected to hot isostatic pressing to increase the density thereof.

Pending U.S. patent application Ser. No. 332,903—M. Lee and L. Szala, filed Dec. 21, 1981 and assigned to the assignee of the instant invention uses alumina, carbon, and titanium hydride as starting materials, the carbon to titanium ratio being somewhat less than the required ratio for stochiometric TiC.

The use of high heating rates during multi-stage sintering of thoria powder compacts is disclosed in "Material Transport During Sintering of Materials With the Fluorite Structure" by Morgan and Yust [Journal of Nuclear Materials 10, 3 (1963) 182-190, North-Holland Publishing Co., Amsterdam]. Densification data therein for a range of heating rates (i.e. 1.6° to 8.0° C./sec.) shows that the density achieved in compacts of $ThO_2$ powder heated to a particular temperature and then air quenched was almost independent of the time required to reach that temperature. Data are also reported for heating rates up to 150° C./sec. The maximum theoretical density achieved by their reported techniques was less than 90%.

The following definitions are applicable to an understanding of this invention and/or the prior art:

SINTERING: development of strength and associated densification of a powder compact through the application of heat alone.

HOT PRESSING: the combined application of heat and of pressure applied through the action of a mechanical piston on the powder-filled cavity of a die. Under such conditions the pressure on the powder compact is non-uniformly applied due to die wall friction and the axial application of the piston force. Under proper conditions of temperature and pressure densification of the compact can result.

HOT ISOSTATIC PRESSING (HIP): The simultaneous application of isostatic pressure and heat to a sample body whose porosity is to be reduced. Pressure is applied uniformly to the sample body by an inert gas. The sample body may be (a) a powder compact encapsulated in a gas impermeable, but deformable, envelop such as a tantalum foil can or a glass coating or (b) any solid substantially devoid of open porosity.

ROOM TEMPERATURE: 67°–72° F.

The sintered product of this invention is considered to be "substantially crystalline", because it is not atypical to encounter minor amounts of non-crystalline material (e.g. glasses) in the grain boundary phases.

This invention addresses a particularly troublesome problem encountered in the sintering of multiphase systems. Such systems frequently contain components, which will chemically interact at elevated temperatures. If such chemical reaction proceeds fast enough to inhibit the desired densification or, if the nature of the reaction is such that it results in degradation of the system (i.e. undesirable solid, liquid or gaseous phases are produced), manufacture of the desired product cannot be successfully accomplished by sintering.

This invention is primarily described herein in respect to the $Al_2O_3$-TiC system, because this particular material system presents the very problem in densification discussed herein above. However, the essential aspects of the sintering process disclosed herein are not dependent upon either the use of particular sintering additives, particular material proportions, or the nature of minor impurities. The process is expected to be broadly applicable to the sintering of powdered ceramic materials, that contain components which will chemically react at elevated temperatures to inhibit densification or degrade the system so that an undesirable sintered product results.

DESCRIPTION OF THE INVENTION

In the practice of the process of this invention in its most essential aspects, a plurality of powdered ceramic materials are consolidated under pressure to produce a cold pressed green compact of some preselected shape and volume, the compact is heated to a maximum sintering temperature with at least the final stage of heating in which the maximum sintering temperature is reached being accomplished at a heating rate in excess of about 100° C. per minute, holding the compact at the maximum sintering temperature for at least the length of time needed to achieve uniform temperature distribution throughout the compact, and then permitting the sintered body so produced to cool.

It has been found that—when the starting powdered ceramic materials comprise, or contain, components that will react together chemically at elevated temperatures and either inhibit densification of the green body or degrade the system such that any resulting sintered product is undesirable—by utilizing sufficiently rapid rate heating, bodies can now be satisfactorily sintered without reliance on sintering additives. The condition required to attain these results is the application of a heating rate during sintering that is fast enough to produce a rate of densification of the green body that exceeds the rate of the unwanted chemical reaction. Usually such a heating rate will exceed about 100° C. per minute. In fact, in sharp contrast to current commercial practice in which very slow heating rates are coupled with long periods of holding at the sintering temperature, sintering rates of 400° C. per minute and hold periods of one minute or less are routinely employed in the practice of this invention.

In the preferred practice of this invention, the green compact is heated to an intermediate transition temperature (ITT) using slow heating (i.e. less than about 50° C. per minute) with subsequent rapid rate heating (i.e., greater than about 100° C. per minute) to the maximum sintering temperature. If desired, of course, more than one change in heating rate may be utilized. By applying the teachings set forth herein a program of multi-rate heating can be developed specific to the sintering of a particular ceramic system, which will combine the optimum sintering cycle with the most economic low temperature heating operation.

In another modification of the process of this invention, after heating to the ITT, the compact can be permitted to cool and then this presintered body can subsequently be heated all the way to the maximum sintering temperature to accomplish the full sintering desired. With this modification, presintering can be accomplished at one location, the presintered compacts can be transferred to another site, and the final sintering can be done at the second location.

Since most ceramic bodies sintered by the practice of this invention achieve a density exceeding 97% of theoretical and have very little open porosity, these sintered bodies can be subjected to HIP without the usual requirement of additional gas impermeable containment or encapsulation.

It is preferable to conduct the sintering operation in a resistance-heated furnace (e.g., molybdenum element) in a high-purity helium atmosphere, the heating rate of the furnace being scheduled over the desired temperature range by a programmable controller. Maximum sintering temperatures employed are typically in excess of 1800° C.

BRIEF DESCRIPTION OF THE DRAWING

The features of this invention believed to be novel and unobvious over the prior art are set forth with particularity in the appended claims. The invention itself, however, as to the organization, method of operation, and objects and advantages thereof, may best be understood by reference to the following description taken in conjunction with the accompanying drawing wherein:

MANNER AND PROCESS OF MAKING AND USING THE INVENTION

This invention is the outgrowth of studies of the sintering characteristics of $Al_2O_3$-TiC and other ceramic materials, focusing on the rate of heating of the unconfined (i.e., as contrasted to being confined as in hot pressing) green compact as the primary parameter variable. In sharp contrast to conventional sintering practice, in which green samples are heated at a typical rate of from about 2° to about 5° C./min. to an isothermal hold at the maximum sintering temperature, which is chosen as low as possible to minimize grain growth, both the heating rates and the sintering temperatures employed are much greater.

Experimental Procedure and Equipment

A high-temperature furnace equipped with a precision dilatometer was used for the conduct of most of the experiments. This furnace was of the resistance heater type, employing a molybdenum heating element with the temperature being controlled by a Data-trak (Research, Inc.) programmable controller using a tungsten-rhenium thermocouple. With this equipment temperatures of over 2000° C. could be maintained in the furnace with an accuracy within a few degrees of the desired value. The capability was also available to enable the application of a very wide range of heating rates ranging from less than one degree per minute to several hundreds of degrees per minute. Provisions were available for evacuating the furnace to 0.1 torr, however, high purity helium or high purity gas such as hydrogen, argon, nitrogen or carbon monoxide were used as the sintering environment during most of the studies.

The dilatometer was made with two molybdenum bars as the reference rod and the push rod in contact with the sample, respectively. The molybdenum bars were mounted horizontally with the push rod cantilevered in a pair of precise bearings. About 10 grams of bias was applied to the sample push rod to compensate for any frictional resistance in the bearing assemblies against sliding movement. This counterweight eliminated occasional problems of sticking of the push rod, but was insufficient to cause any deformation of the sample. The relative position of the push rod and the reference rod was detected by a linear voltage differential transformer (LVDT). The LVDT of the dilatometer at its maximum sensitivity range of 322 volts/inch is linear in response over the range of ±13 volts. The digitized output of the LVDT as well as the furnace temperature and sintering times were recorded automatically by a North Star microcomputer.

The unique advantage offered by the apparatus arrangement described was the capability for obtaining from the dilatometer traces an appreciation of the extremely rapid rate at which green compact shrinkage occurs during sintering runs. It was the understanding obtained from this information, which led to the conclusion that expending a long time to reach the sintering temperature and/or holding the body being sintered at high temperature for extended periods are detrimental to the achievement of maximum densification.

A second somewhat larger molybdenum heating element furnace similar in design to the above-described furnace but without a dilatometer was used in the conduct of sintering studies of larger samples to be used as cutting tools. An ASEA Pressure Systems, Inc. Mini Hipper was used for the treatment by HIP of sintered samples. In HIP studies, pressure and temperature were varied but the pressure medium for most of these studies was nitrogen.

Powders for the sintering studies were ball milled, usually employing cemented tungsten carbide milling media. The milling of Al$_2$O$_3$-TiC powder for periods ranging from 24 to 48 hours in a carbide ball mill will leave as much as 4 wt % (w/o) of tungsten carbide and about 0.4 w/o of cobalt in the milled powder. Some controlled milling experiments were carried out using 99.5+ purity alumina milling media in a plastic container to eliminate residual cemented tungsten carbide contaminants. This work provided a comparison for determining the lack of effect of milling contaminants on sintering.

Heating Rate

One of the sintering parameters found most crucial in influencing the ultimate sintered density and fine grain microstructure of an Al$_2$O$_3$-TiC composite at a given sintering temperature was the rate of heating of the green compact up to the maximum sintering temperature. The graphs in FIG. 1 indicate the percent change in compact dimension recorded by the dilatometer as a function of temperature for several sintering runs employing very different heating rates. The curves resulting from heating at the various heating rates are identified in the following Table.

TABLE I

| Curve | Heating Rate (°C./min) |
|---|---|
| a | 20 |
| b | 30 |
| c | 100 |
| d | 400 |

Figure 1:
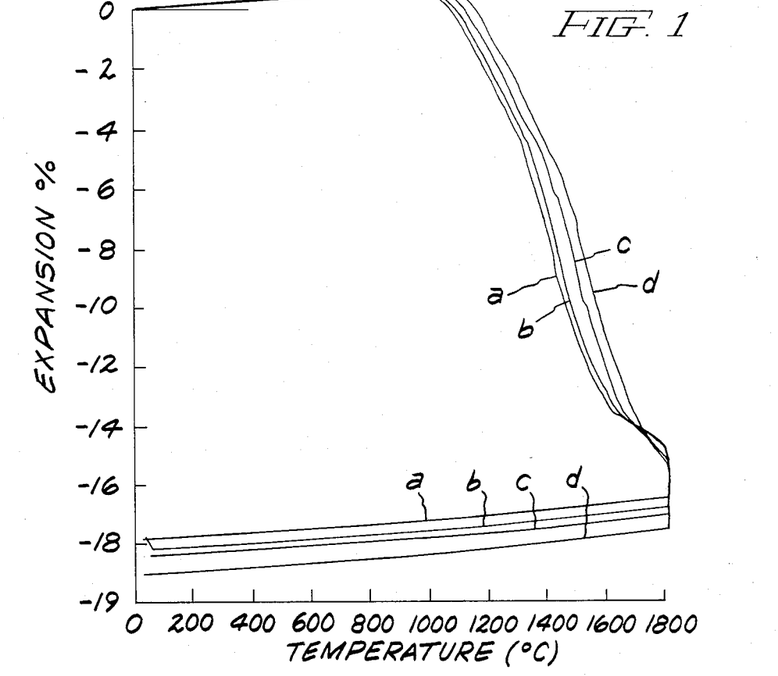
FIG. 1 presents a set of graphs depicting the percent changes in sample dimension as a function of temperature for several sintering runs employing vastly different heating rates.

The apparent temperature readings for the green compacts, or samples, were recorded by means of a thermocouple placed adjacent to each sample. For the runs reflected in curves a, b, c and d each sample was held at the sintering temperature of 1820° C. for 1 hour.

Certain features common to curves a, b, c and d of FIG. 1 prove to be particularly important. Except for the normal thermal expansion of the green body as temperature was increased, no other change in sample dimension was apparent until the temperature reached about 1000° C. From that point on all of the samples densified very rapidly, the densification rate being so rapid that, when the expected difference between the actual sample temperature and the value recorded by the thermocouple is taken into account, the degree of densification can be seen to have been mainly a function of sample temperature. This condition prevailed for the broad spectrum of heating rates until a temperature slightly in excess of 1600° C. was reached. The densification rate above 1600° C., however, depended on the rate of heating of the samples reflecting the extent to which densification rate or rate of chemical reaction prevailed. Recorded dilatometer data indicated that at a given sample temperature above 1600° C., the greater the rate of heating, the higher the final sintered sample density. In fact, that data indicated that the heating rate (HR) necessary to achieve a desired fraction of theoretical density at a maximum sintering temperature of 1820° C. is an exponential function of the fraction of theoretical density, which is $$\frac{\rho}{\rho_{th}} = .046 \log(HR) + .81.$$

A similar relationship is expected to hold at higher maximum sintering temperatures. Although impractical at present, an Al$_2$O$_3$-TiC composite is expected to fully densify at 1820° C. at heating rates greater than 10,000° C./min.

Sintering Temperature

Figure 2:
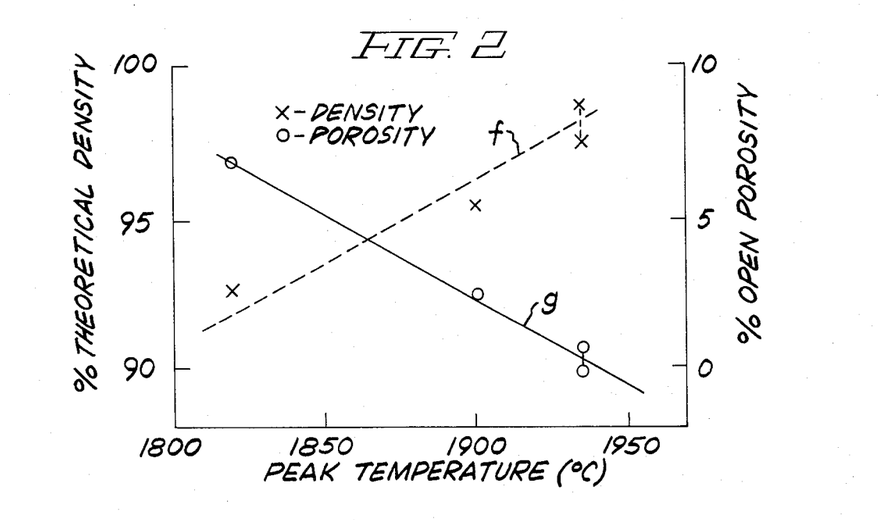
FIG. 2 shows the relationships between maximum sintering temperature and final density and between maximum sintering temperature and open porosity.

Another important sintering parameter is sintering temperature. When heat is applied to an Al$_2$O$_3$-TiC green compact at a constant heating rate, the final sintered density thereof increases as the maximum sintering temperature is raised. The final densities obtained for sintered samples heated at 400° C./min. to temperatures from 1820° to 1950° C. are shown as a function of sintering temperature in FIG. 2 (curve f). Each sample was held for two minutes at the preselected sintering temperature. As is manifest in curve f, the final density of the samples increased linearly with increasing sintering temperature within the range investigated. Sample densities greater than 99% of theoretical were obtained by sintering at 1950° C. with a heating rate of greater than 200° C./min. As is shown by curve g, samples sintered at the higher temperatures have essentially no open porosity. This is of particular importance, because samples so prepared can, in a subsequent step after cooling, be hot isostatically pressed without the need for encapsulation.

Total Sintering Time

The total sintering time at temperature (i.e., the isothermal hold) is still another important parameter. The degree of densification achieved by holding samples (i.e., consolidated powder ceramic materials as green compacts) at the sintering temperature for the same length of time is different depending upon the sample density at the beginning of the sintering hold. Samples heated at a slower rate underwent less shrinkage at the beginning of the holding period and somewhat more shrinkage during the holding period than did rapidly heated samples. However, as is shown in FIG. 1 by the total shrinkages displayed, the final densities achieved for the rapidly heated samples were still greater. At sintering temperatures approaching 1950° C., runs conducted at heating rates greater than 200° C./min., the sample density reached nearly 100% of the theoretical density using a very short isothermal hold time. In fact, if the isothermal hold is extended beyond the minimum time required to achieve a uniform temperature distribution throughout the sample, the result will be an actual decrease in the density of the sintered body produced. This was demonstrated in the densification of pressed powder samples of magnesia-doped alumina.

Figure 3:
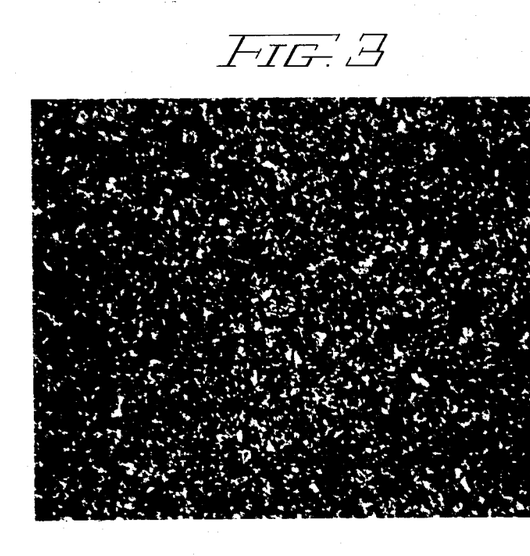
FIG. 3 is an optical micrograph displaying the grain size of a rapid-rate sintered alumina-titanium carbide body.

Whereas it would be expected that the use of very high sintering temperatures would produce larger-than-acceptable grain size in the sintered body and thereby adversely affect hardness and strength, it has been found that the grain size of rapid-rate sintered $Al_2O_3$-TiC parts actually is comparable to that of state-of-the-art commercial products of similar composition produced by HIP at much lower temperatures. FIG. 3 is an optical micrograph showing a microstructure produced by sintering at 1950° C. In spite of the high sintering temperature, the average particle diameter is smaller than about 2 micrometers.

Use of Hot Isostatic Press

Figure 4:
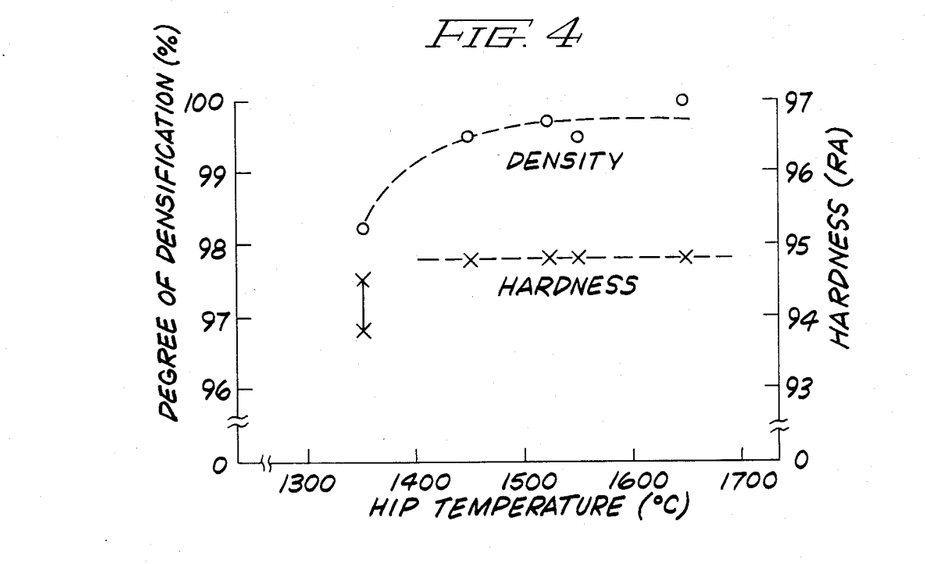
FIG. 4 exhibits the changes in density and hardness of sintered samples prepared in accordance with this invention and then subjected to the additional step of HIP.

The feasibility of closing residual porosity in sintered bodies by the use of HIP was also investigated. Most bodies sintered by the practice of this invention to a density exceeding 97% theoretical have very little remaining open porosity. Such open porosity as remained was concentrated mainly in a thin surface layer over the sintered body. Frequently, sintered samples having densities as low as 94% theoretical showed dense microstructures without any interconnected network of pores beneath this thin surface layer, or scale. A number of sintered samples having densities ranging from about 97.5% to 98.5% theoretical were subjected to HIP under 15,000 psi argon for 15 minutes at various temperatures. The final density and Rockwell A(RA) hardness of the sample after HIP are shown in FIG. 4. All samples subjected to HIP at temperatures above 1400° C. achieved densities greater than 99.5% and also exhibited excellent hardness. Although subjecting samples to HIP at 1350° C. showed some gains in density and hardness, the gains were not considered adequate. These studies have shown that a minimum temperature of at least about 1450° C. is required during HIP to produce a technologically useful sintered body using the $Al_2O_3$-TiC system. One HIP experiment was carried out at 1550° C., which showed that no additional pore closure is achieved after about 2 minutes at temperature and pressure. Comparison of the microstructures before and after HIP at 1650° C. for 15 minutes showed that the TiC grains increased in size during the HIP cycle.

Thermal Fracture Consideration

It has been found that, when cold pressed $Al_2O_3$-TiC bodies are subjected to rapid rate sintering from room temperature to the maximum sintering temperature, the green body frequently cracks during the sintering process due to the severe thermal shock. This thermal shock occurs, because the green body has insufficient strength to offset the internal thermal gradients, and associated thermal stresses, imposed during overly rapid rate heating. In hot pressing the ceramic powders are placed in a mold, which, after assembly, is placed with its contents in the vacuum chamber of a vacuum hot press where the mold is subjected to the pressure of opposing pistons to consolidate the powder prior to moving the mold into the hot zone of the furnace for conduct of the hot pressing operation. Because of its containment within a mold, the cold pressed green body in this instance is supported against thermal stresses imposed during the sintering process and the rapidity of the rate of heating does not invoke the problem of thermal fracture encountered during sintering of an unsupported green body.

According to the sintering characteristics monitored by the dilatometer, sintering begins about 1000° C. (FIG. 1). As noted hereinabove, densification of $Al_2O_3$-TiC green bodies as a function of temperature is essentially independent of the heating rate up to a temperature of about 1600° C. However, observable heating rate effects are apparent above about 1600° C.

Figure 5:
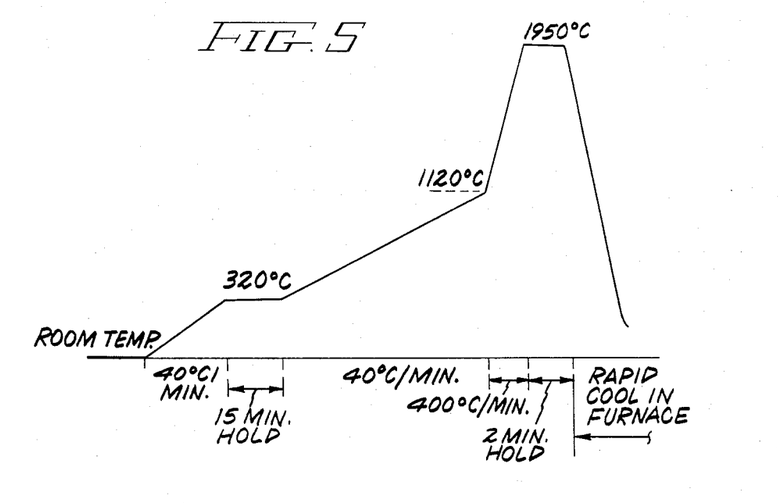
FIG. 5 sets forth a schematic description of a typical sintering cycle according to this invention, and FIG. 6 displays the effect that ITT has on the final density of the sintered body.
Figure 6:
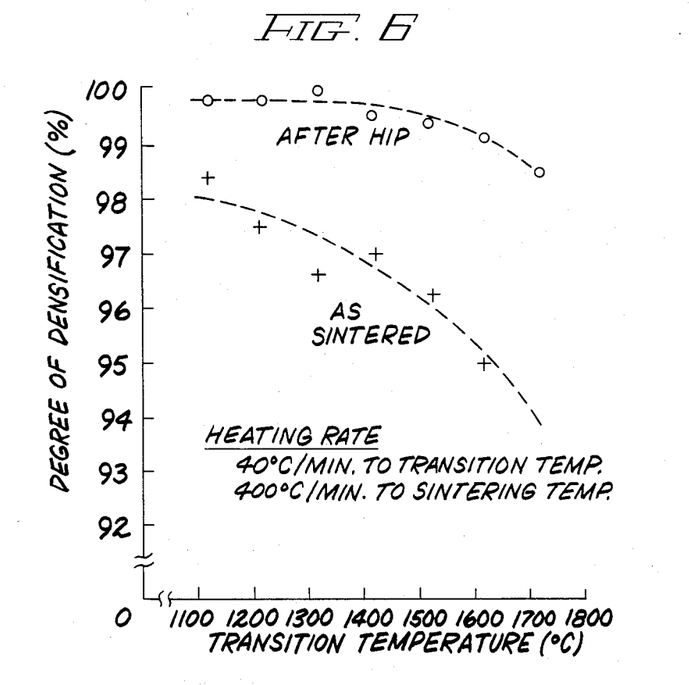

In accordance with these findings and the teachings of this invention, a high material density for sintered ceramic specimens can be achieved advantageously by heating the green bodies slowly up to some given ITT and then increasing the heating rate to reach the desired maximum sintering temperature. A schematic description of a typical sintering cycle according to this invention for $Al_2O_3$-base ceramics is shown in FIG. 5. A series of experiments was conducted in helium in which the heating rate was changed abruptly from 20° C./min. to 400° C./min. The temperature (ITT) at which this change was made was increased by 100° C. in each succeeding experiment. The effect that the ITT had on the final density in these experiments is shown in FIG. 6. Samples for these tests were cold pressed at 30,000 psi, heated to 320° C. for a 15 minute hold and then heated, first to the selected ITT and then to a 30 second isothermal hold at the maximum sintering temperature of 1950° C. The heating regime in each instance was in general accord with that shown in FIG. 5. The modified heating cycle represented by FIG. 5 successfully prevented the occurrence of thermal cracking.

Modifications in the heating cycle as represented in FIG. 5 may be made to accommodate green bodies of various thicknesses. Thus, given a green body with a maximum thickness of about ¾ inch, or thinner, the heating cycle of FIG. 5 (with perhaps a higher ITT) will be typical. For those instances in which the green body is thicker than about ¾ inch, the heating rate of ITT will usually be lower than the 40° C./min. shown, the proper value being routinely determinable.

In those instances in which green bodies were presintered at one site for transport to a second site for sintering, a useful presinter sequence for $Al_2O_3$-TiC compacts was as follows:

(1) the $Al_2O_3$-TiC compacts were prepared by pressing WC ball-milled powder to 50 Kpsi;
(2) the compacts were presintered by heating in vacuum to 1400° C. at a heating rate of about 5° C./min and
(3) the presintered compacts were permitted to cool to room temperature.

Thereafter at the second site the heating cycle of FIG. 5 (using a 30 second hold at 1950° C.) was employed to achieve the desired densification.

The hold at maximum sintering temperature can vary depending on the size of the body being sintered, but preferably the hold period will not exceed about 2 minutes.

Selection of the ITT to be employed can be routinely accomplished with the understanding that selecting too high an ITT results in the samples being at high temperature for extended lengths of time and this contributes to the formation of surface scale in which there is a higher concentration of pores than in the body of the sample itself. In the case of $Al_2O_3$-TiC not only the formation of porosity, but also loss of TiC from the surface layer due to chemical reaction can occur. As long as the ITT is selected high enough to provide the sample with sufficient internal strength to counteract the thermal stresses that will be induced by heating at the high rate (i.e., at greater than 100° C./min.), the slow heating will have achieved its objective. The simplest approach to determining an optimum ITT is by the joint application of the teachings provided by FIGS. 1 and 6 and the description relative thereto. When the sintered product is to be used as a cutting tool, machining tests should also be included as a parameter in optimizing the heating sequence.

Property Tests

One engineering property that is quite sensitive to the presence of minor residual porosity in the sintered body as well as to the grain size of sintered material therein is macrohardness. Rockwell hardness of materials that have been subjected to HIP in FIG. 4 demonstrate that sintered material produced by the practice of this invention develops a hardness at least equal to, or harder than, the average hardness (a value of about 94 Rockwell A) of the best commercial hot pressed material of similar composition. Rockwell A and Rockwell C hardness as used and determined herein are in accordance with ASTM designation: E18-74.

Transverse rupture strength (TRS) of some of the as-sintered samples and of the sintered samples after being subjected to HIP, was determined by the use of the 3-point bend test. The results are shown in Table II. As the data set forth therein will indicate, some individual samples of as-sintered bars have very high strength and the ASTM B406-70 value of TRS for the limited number of as-sintered samples tested is lower than that of bars subjected to HIP. However, scatter in the data is much less for the samples subjected to HIP than for the as-sintered bars.

TABLE II

| Sample | As Sintered (psi) | After HIP (psi) |
|---|---|---|
| 1 | 69,000 | 96,000 |
| 2 | 148,000 | 104,000 |
| 3 | 94,000 | 88,000 |
| 4 | 83,000 | 89,000 |
| 5 | | 107,000 |
| 6 | | 107,000 |
| 7 | | 92,000 |
| Average | 98,500 | 97,600 |
| ASTM B406-70 | 82,000 | 97,600 |

The HIP TRS value of about 98,000 psi average is in good agreement with reported TRS values of $Al_2O_3$-TiC composites.

Machining Tests

A number of cutting tools were produced in the following manner: alumina having an average particle diameter of less than 1 micrometer was mixed with 30 wt % TiC powder having an average particle diameter of less than 2 micrometers; the mixture was ball milled in a cemented tungsten carbide mill; isostatically pressed to the shape of a cylinder having a diameter of about ½"; discs about ⅜" thick were cut off the bar and these discs were sintered at 1950° C. for about 1 minute as described herein. The heating rate was 40° C./min. up to about 1100° C. after which the heating rate was raised to 400° C./min. to bring the discs to the maximum sintering temperature. All sintered discs were subsequently subjected to HIP for the times, temperatures and pressures shown in Table III. The resulting high density sintered discs were ground to ⅜" diameter with a thickness of 3/16". The edge of each tool was ground to give a 20° chamfer. The hardness of the chilled cast iron workpiece machined for the tests was 57 to 58 Rockwell-C. The depth of cut was 0.04" and the feed per revolution was 0.008". The tool holder used had a 5 degree negative back and side rake angles. The cutting speed for all tests was 300 surface feet per minute. No coolant was used for the test and after 5 minutes of machining, the uniform flank wear land was measured along with any depth of cut line (DCL) notch. The test results indicate that the sintered discs prepared by the practice of this invention function as excellent cutting tools for the machining of hard cast iron.

TABLE III

| Tool No. | HIP Conditions T(°C.) | t(min) | P(ksi) | Flank Wear (in) | Depth-of-Cut Notch (in) | Comments |
|---|---|---|---|---|---|---|
| 50A | 1650 | 30 | 15 | .003 | .007 | |
| 50B | 1650 | 30 | 15 | .0025 | — | |
| 46 | 1550 | 10 | 15 | .0021 | .0035 | Minor spall |
| 48 | 1525 | 30 | 15 | .0028 | .0035 | |
| 52A | 1525 | 30 | 15 | .0028 | — | Minor edge chipping |
| 49 | 1450 | 60 | 15 | .0028 | — | |
| 53A | 1450 | 60 | 15 | .0028 | — | |
| 53B | 1450 | 60 | 15 | .0028 | — | |
| 51A | 1350 | 60 | 15 | .0035 | .0056 | Chips on cutting edge |
| 51B | 1350 | 60 | 15 | .0030 | .0049 | Chips on cutting edge |
| ** | | | | .0042 | .007 | Edge Spall |

**Commercial hot pressed $Al_2O_3$—TiC Tool of similar composition

A limited number of machining tests were carried out on an IN718 alloy workpiece. The sintered cutting tools were prepared in the manner described hereinabove and the cutting tools exhibited performances equivalent to those of similar grade commercial tools.

Effect of Additives

It was decided to investigate the effect of the presence of additives or impurities, it being appreciated, however, that sintering aids are not required in the successful practice of this invention.

For this evaluation a powder composition was prepared containing 59 w/O $Al_2O_3$, 30 w/o TiC and 11 w/o $ZrO_2$. Samples of this ternary composite powder were sintered in general accordance with the heating program of FIG. 5 after determining the temperature dependent sintering characteristics thereof by monitoring with the in-furnace dilatometer. Some of the samples were exposed to a maximum sintering temperature of 1935° C. These samples actually increased in dimension (i.e., swelled) after reaching maximum density. Optical micrographs of the cross-section of such a sintered sample revealed that fairly large random pores had resulted. By reducing the maximum sintering temperature to 1900° C., the swelling was eliminated. Another unique feature encountered with this ternary system in all samples sintered at a temperature in excess of 1880° C., was the appearance on cooling of shrinkage at about 1875° C. This shrinkage is probably associated with solidification at the $ZrO_2$-induced eutectic temperature. In initial trials, all sintered samples of this ternary system cracked. The cracking problem was resolved, however, by reducing the sintering temperature below 1875° C. and using $ZrO_2$ particles less than one micrometer average particle diameter.

Sintered bodies were also prepared in which small quantities (about 0.5 w/o of cobalt) was added to the $Al_2O_3$-TiC. No apparent problem was encountered in either the rapid rate sintering of the $Al_2O_3$-TiC or in the subsequent HIP of the as-sintered bodies. Three point bend strength tests of the samples yielded values of 103 kpsi. These strengths are comparable to the values obtained from the $Al_2O_3$-TiC powder mixture substantially free of impurities and clearly free of cobalt. The sintering atmosphere used for most experiments having the cobalt addition was high purity helium.

The ceramic powders can be mixed by the use of any of the conventional techniques such as, for example, ball milling, laboratory milling or jet milling to produce a substantially uniform or homogeneous dispersion or mixture. The more uniform the dispersion, the more uniform the microstructure and, consequently, the properties of the resulting sintered body.

In the powder mixtures prepared for consolidation into a green compact, the average particle diameter ranges from 0.1 μm to about 5 μm. An average particle size less than about 0.1 μm is not useful, since it is generally difficult or impractical to compact such powders to a density sufficient for handling purposes. Powders with an average particle size greater than about 5 μm will not produce a useful end product. Preferably, the average particle size of the powder mixture ranges from about 0.3 μm to about 1 μm.

A number of techniques can be used to shape the ceramic powder mixture into a green compact. For example, it can be extruded, injection molded, die-pressed, isostatically pressed or slip cast to produce a compact of desired shape. Any lubricants, binders or similar materials used in shaping the powder mixture should have no significant deteriorating effect on the resulting sintered body. Such materials are preferably of the type which evaporate on heating at relatively low temperatures preferably below about 350° C., leaving no significant residue. The green compact should have a density at least sufficient to enable handling thereof and, preferably, its density will be as high as can be obtained to promote the overall densification occurring during sintering.

The present invention makes it possible to reproducibly and economically fabricate complex shaped ceramic articles directly. The sintered product of this invention can be produced in the form of a useful, simple, complex or hollow shaped article without machining. The dimensions of the sintered product would differ from those of the green compact by the extent of dimensional change occurring during shrinkage. The $Al_2O_3$-TiC system as sintered in the practice of this invention has particular utility in the preparation of tool inserts for machining operations.

The invention is further illustrated by the following examples. In each example the powders were pre-pressed isostatically to 50 Kpsi. The compacted plugs ($\sim \frac{3}{4}$" long by $\frac{1}{4}$" diameter) so produced were processed in the dilatometer-equipped furnace. The furnace was evacuated to 50 μm vacuum, helium was introduced and was allowed to purge the furnace at one atmosphere pressure during the rest of the cycle. In each example the sintering cycle used a heating rate of 40° C./min to reach 1120° C. (ITT) including a 15 minute hold at 320° C. to degas and stabilize the furnace and controller. Upon reaching 1120° C. the heating rate was immediately increased to the rapid rate of 400° C. (except in EXAMPLE 1) and ramped to the preselected maximum temperature. In EXAMPLE 1 the rapid rate heating was conducted at 350° C./min, because of an error in the programming of the controller. Natural furnace cooling was relied upon to reduce the temperature to room temperature.

Where values are indicated, material density was determined by immersion density measurement. In all examples, the sintered bodies had essentially no open pores. Microstructural observations were made in most instances.

EXAMPLE 1

The starting powder mixture was 50 wt % $Al_2O_3$ (0.3 μm) and 50 wt % TiC (1-5 μm). This mixture was milled with WC balls for 24 hours using acetone solvent. The maximum sintering temperature was 1950° C. and a sintered density of 4.5 g/cc was produced for the sintered body. HIP of the sintered body in argon followed with the temperature thereof being raised from room temperature to 1520° C. at the rate of 30° C./min and then maintaining the temperature at 1520° C., a pressure of 15 Kpsi was applied for 20 minutes. The HIP treatment increased the density to 4.53 g/cc.

The sintered body was extremely dense and exhibited a hardness of RA=94.6.

EXAMPLE 2

Starting with a powder mix of 85 wt % $Al_2O_3$ (0.3 μm) and 15 wt % TiC (0.14 μm) ball milling with WC balls (acetone solvent) was conducted for 24 hours. The firing conditions for sintering were the same as in EXAMPLE 1 and the sintered body had a density of 3.65 g/cc. Thereafter HIP was conducted as described in EXAMPLE 1 resulting in a density of 3.67.

The resulting body exhibited some residual porosity indicative of unsatisfactory sintering. It was concluded that the initial TiC grain size was too fine and was responsible for poor initial powder packing density.

EXAMPLE 3

Al$_2$O$_3$ and ZrO$_2$ powder (Al$_2$O$_3$-12.7 ZrO$_2$ by weight) were attritor milled for 6 hours. The maximum sintering temperature was 1800° C. resulting in a density of 4.244 g/cc (99.8% of theoretical). The body was well sintered as was evident from microstructural observation.

EXAMPLE 4

The powder mix (Al$_2$O$_3$-30 wt % TIC-7 wt % ZrO$_2$) was ball milled (WC balls) for 12 hours. Maximum sintering temperature was 1835° C. and the sintered density was 4.24 g/cc. After HIP (1520° C. and 15 Kpsi) for 20 minutes in argon the density was increased to 4.46 g/cc. Hardness was measured (RA=93.6) and microstructural observations established that the material was fully dense.

EXAMPLE 5

Starting powder was Al$_2$O$_3$ (0.3 μm)-30 wt % TiN (−325 mesh). This mix was milled for 172 hours using WC balls. During the sintering the maximum temperature of 1820° C. was held for one minute. Sintered density was 4.396 g/cc.

The sintered body showed residual closed pore porosity. Subsequent HIP should eliminate this condition.

EXAMPLE 6

The powder used was Al$_2$O$_3$ doped with 500 ppm MgO. Sintering was carried to 1970° C. with a hold of 30 seconds at this temperature. The measured density was 3.90 g/cc (98% of theoretical), which density increased to 99.5% of theoretical after HIP (1550° C./15 Kpsi for 15 minutes in argon).

EXAMPLE 7

Commercial grade Y$_2$O$_3$ powder was sintered using a maximum firing temperature of 1960° C. producing a nearly pore-free structure.

Although the process of this invention was used in EXAMPLES 8, 9 and 11, selection of the particular ceramic systems was not the invention of the inventive entity involved herein.

EXAMPLE 8

The starting ceramic powder mix was 62 wt % Al$_2$O$_3$ (0.3 μm)-38 wt % (50 wt % WC-50 wt % TiC as a solid solution). The WC/TiC powder was −325 mesh. The WC/TiC was milled for 100 hours using WC balls; the Al$_2$O$_3$ was added and milling proceeded for an additional 72 hours. During sintering the temperature was ramped to 1950° C. and held for 30 seconds. Density of the sintered body was 4.97 g/cc; HIP produced further densification to 5.2 g/cc.

Examination showed extremely fine well-sintered material with sub-micron size grain size for the carbide phase. Hardness was determined to be 93.8 (RA).

EXAMPLE 9

Three powder compositions: 70.3 wt % Al$_2$O$_3$ (0.3 μm)-24.7 wt % TiC (−325 mesh)-5 wt % Cr$_3$C$_2$ (−325 mesh) were processed in a carbide (i.e. WC balls) mill with the TiC and Cr$_3$C$_2$ ball milled first for 120 hours after which the Al$_2$O$_3$ powder was added and milling proceeded for a further 120 hours. Sintering employed a maximum temperature of 1950° C. with a hold period of one minute. Sintered density was found to be 4.626 g/cc. HIP raised the density to 4.63 g/cc.

The product exhibited very fine grain size. Some reaction between TiC and Cr$_3$C$_2$ may have occurred.

EXAMPLE 10

In this example the ceramic powder mixture was Al$_2$O$_3$-25 wt % Si$_3$N$_4$. Carbide milling was conducted for 16 hours. Maximum sintering temperature was 1775° C. with no hold at temperature.

The resulting body was well-sintered, dense and had a uniform microstructure. However, the body was very brittle and X-ray analysis indicated that some Al$_2$O$_3$ reacted with the Si$_3$N$_4$ forming SiAlON compound.

EXAMPLE 11

Sialon powder was mixed with 10 wt % YAG (yttrium-aluminum-garnet) and carbide milled for 15 hours. The sialon composition (values expressed in molar percent) was $Si=6-x$; $Al=x$; $O_2=x$; $N_2=8-x$ where $x=0.8$. The temperature ramp from 320° C. to 1810° C. during sintering was at a heating rate of 200° C./min with a one minute hold at 1810° C. Sintered density was found to be 3.32 g/cc (98.8% of theoretical).

As is the case with all sialon compositions, achieving full density requires HIP. Analysis by X-ray of the sintered body shows the presence of some residual alpha Si$_3$N$_4$. This result is in contrast to the product produced by either hot pressing or by long-time sintering wherein all of the Si$_3$N$_4$ is converted to the beta form. Although alpha Si$_3$N$_4$ is harder than beta Si$_3$N$_4$ it is not as strong.

What is claimed is:

1. In the process for preparing multi-phase, substantially crystalline, sintered ceramic bodies in which a mixture of different powdered ceramic materials are consolidated under pressure to produce a pressed powder body of a preselected shape and volume, which unconfined pressed powder body is then heated in a furnace to a maximum sintering temperature and then permitted to cool, said mixture containing components that can chemically interact at elevated temperatures to inhibit densification or form phases undesirable for sintering, the improvement of employing a rapid heating rate in excess of about 100° C. per minute during at least that part of the heating cycle in which said maximum sintering temperature is reached and holding at said maximum temperature for a period of time long enough to achieve uniform temperature distribution throughout said pressed powder body, said heating rate being rapid enough to densify said pressed powder body at a rate exceeding the rate of chemical reaction of said components and recovering a sintered body having a density of at least 94% theoretical and being free of any interconnected network of pores.

2. The improved sintering process recited in claim 1 wherein holding at maximum sintering temperature is for a period of less than about two minutes.

3. The improved sintering process recited in claim 2 wherein a heating rate in excess of about 200° C. per minute is employed in reaching the maximum sintering temperature.

4. The improved sintering process recited in claim 1 wherein heating is interrupted prior to reaching the maximum sintering temperature and the body is permitted to cool before the heating to maximum sintering temperature is resumed and a heating rate in excess of about 100° C. per minute is employed in reaching the maximum sintering temperature.

5. The improved sintering process recited in claim 1 wherein the powdered ceramic material is an alumina-base powder.

6. The improved sintering process in claim 5 wherein the alumina-base powder comprises a mixture of aluminum oxide powder and titanium carbide powder.

7. The improved sintering process recited in claim 6 wherein the mixture includes a minor amount of magnesium oxide powder dispersed therethrough.

8. The improved sintering process recited in claim 6 wherein the mixture includes zirconium oxide powder.

9. The improved sintering process recited in claim 6 wherein the mixture includes minor amounts of cobalt and tungsten carbide.

10. The improved sintering process recited in claim 6 wherein the heating is conducted in a substantially carbon-free environment.

11. The improved sintering process recited in claim 1 wherein the maximum sintering temperature is in excess of 1800° C.

12. The improved sintering process recited in claim 5 wherein the alumina-base powder comprises a mixture of aluminum oxide powder and titanium nitride powder.

13. The improved sintering process recited in claim 1 wherein the body is heated to an intermediate transition temperature using a heating rate of less than about 50° C. per minute and the maximum sintering temperature is reached by heating above the intermediate transition temperature at a rate greater than about 100° C. per minute.

14. The improved sintering process recited in claim 13 wherein the intermediate transition temperature is between about 1000° C. and about 1720° C.

15. The improved sintering process recited in claim 13 wherein the intermediate transition temperature is between about 1100° C. and about 1400° C.

16. The improved sintering process recited in claim 15 followed by hot isostatic pressing of the sintered body to achieve 100% of the theoretical density with 0% open porosity.

17. The improved sintering process recited in claim 14 wherein the intermediate transition temperature is between about 1400° C. and about 1720° C.

18. The improved sintering process recited in claim 17 followed by hot isostatic pressing of the sintered body to achieve greater than 98% theoretical density with less than 1% open porosity.

19. The improved sintering process recited in claim 1 followed by hot isostatic pressing of the resulting sintered ceramic body.

20. The improved sintering process recited in claim 5, wherein the alumina-base powder contains zirconia.

21. A process for sintering an alumina-base ceramic powder comprising the steps of:
 a. cold pressing said powder to produce a pressed powder body of preselected shape and size, said powder containing components able to chemically react at elevated temperatures to inhibit densification or form phases undesirable for sintering,
 b. heating said body in the unconfined state in a furnace to a maximum sintering temperature employing more than one different heating rate with the heating rate actually attaining said maximum sintering temperature being greater than about 100° C. per minute, greater than any preceding heating rate and rapid enough so that the rate of densification exceeds the rate of chemical reaction of said components,
 c. holding said body at said maximum sintering temperature for a period of time at least sufficiently long to achieve uniform temperature distribution throughout said body,
 d. permitting said body to cool and
 e. recovering said body sintered to a density of at least 94% theoretical and free of any network of interconnected pores.

22. The sintering process recited in claim 21 wherein the heating is interrupted before the maximum sintering temperature is reached and the body is permitted to cool before heating is resumed.

23. The sintering process recited in claim 22 wherein the body is permitted to cool to room temperature before heating is resumed.

24. The sintering process recited in claim 21 wherein holding at maximum sintering temperature is for a period of less than about two minutes.

25. The sintering process recited in claim 21 wherein a heating rate in excess of about 200° C. per minute is employed in actually attaining the maximum sintering temperature.

26. The sintering process recited in claim 21 wherein the alumina-base powder comprises a mixture of aluminum oxide and titanium carbide.

27. The sintering process recited in claim 26 wherein the mixture includes a minor amount of magnesium oxide powder dispersed therethrough.

28. The sintering process recited in claim 26 wherein the maximum sintering temperature is in excess of 1800° C.

29. The sintering process recited in claim 26 wherein the heating is conducted in a substantially carbon-free environment.

30. The sintering process recited in claim 21 wherein the body is heated to an intermediate transition temperature using a heating rate of less than about 50° C. per minute and the maximum sintering temperature is attained by heating above the intermediate transition temperature at a rate in excess of about 100° C. per minute.

31. The sintering process recited in claim 30 wherein the intermediate transistion temperature is between about 1000° C. and 1720° C.

32. The sintering process recited in claim 31 wherein the intermediate transition temperature is between about 1000° C. and about 1400° C.

33. The sintering process recited in claim 32 followed by hot isostatic pressing of the sintered body achieving 100% of the theoretical density with substantially no open porosity.

34. The sintering process recited in claim 31 wherein the intermediate transition temperature is between about 1400° C. and about 1720° C.

35. The sintering process recited in claim 34 followed by hot isostatic pressing of the sintered body to achieve greater than 98% of the theoretical density with less than 1% open porosity.

36. The sintering process recited of claim 21 followed by hot isostatic pressing of the resulting sintered ceramic body.

37. In the process for preparing a multi-phase, substantially crystalline, sintered ceramic cutting tool in which a mixture of different powdered ceramic materials are consolidated under pressure to produce a pressed powder body of a preselected shape and volume, which unconfined pressed powder body is heated in a furnace to a maximum sintering temperature and then permitted to cool, said mixture containing components that can chemically interact at elevated temperatures to inhibit densification or form phases undesirable for sintering, the improvement of employing a rapid heating rate in excess of about 100° C. per minute during at least that part of the heating cycle in which said maximum sintering temperature is reached, holding at said maximum temperature for a period of time long enough to achieve uniform temperature distribution throughout said pressed powder body, said heating rate being rapid enough to densify said pressed powder body at a rate exceeding the rate of chemical reaction of said components, permitting the sintered body to cool, subjecting said sintered body to hot isostatic pressing, and recovering said sintered body having a density of greater than 98% of the theoretical density and free of any interconnected network of pores.

38. The improved sintering process recited in claim 37 wherein holding at maximum sintering temperature is for a period of less than about two minutes.

39. The improved sintering process recited in claim 37 wherein a heating rate in excess of about 200° C. per minute is employed in reaching the maximum sintering temperature.

40. The improved sintering process recited in claim 37 wherein heating is interrupted prior to reaching the maximum sintering temperature and the body is permitted to cool before the heating to maximum sintering temperature is resumed and a heating rate in excess of about 100° C. per minute is employed in reaching the maximum sintering temperature.

41. The improved sintering process recited in claim 37 wherein the powdered ceramic material is an alumina-base powder.

42. The improved sintering process in claim 41 wherein the alumina-base powder comprises a mixture of aluminum oxide powder and titanium carbide powder.

43. The improved sintering process recited in claim 42 wherein the mixture includes a minor amount of magnesium oxide powder dispersed therethrough.

44. The improved sintering process recited in claim 42 wherein the mixture includes zirconium oxide powder.

45. The improved sintering process recited in claim 42 wherein the mixture includes minor amounts of cobalt and tungsten carbide.

46. The improved sintering process recited in claim 42 wherein the heating is conducted in a substantially carbon-free environment.

47. The improved sintering process recited in claim 42 wherein the maximum sintering temperature is in excess of 1800° C.

48. The improved sintering process recited in claim 41 wherein the alumina-base powder comprises a mixture of aluminum oxide powder and titanium nitride powder.

49. The improved sintering process recited in claim 6 wherein the maximum sintering temperature is in the range of 1850° C.

50. The sintering process recited in claim 26 wherein the maximum sintering temperature is in the range of 1850° C.

* * * * *